United States Patent [19]

Walsh

[11] Patent Number: 5,436,686
[45] Date of Patent: Jul. 25, 1995

[54] COMPACT CAMERA WITH COVER FOR HANDLE

[75] Inventor: Desmond M. Walsh, Abington, Mass.

[73] Assignee: Eastman Kodak Company, Rochester, N.Y.

[21] Appl. No.: 188,625

[22] Filed: Jan. 28, 1994

[51] Int. Cl.⁶ ............................................. G03B 17/02
[52] U.S. Cl. ..................................... 354/288; 354/82; 354/219; 354/223
[58] Field of Search ................. 354/288, 82, 293, 219, 354/223

[56] References Cited

U.S. PATENT DOCUMENTS

| | | | |
|---|---|---|---|
| D. 263,717 | 4/1982 | Schlagheck et al. | D16/1 |
| D. 263,846 | 4/1982 | Schlagheck et al. | D16/1 |
| D. 263,847 | 4/1982 | Schlagheck et al. | D16/1 |
| D. 264,975 | 6/1982 | Schlagheck et al. | D16/1 |
| 4,106,037 | 8/1978 | Nakamura et al. | 354/128 |
| 4,349,266 | 9/1982 | Maeda et al. | 354/288 |
| 4,796,034 | 1/1989 | Leonard et al. | 354/145.1 |
| 5,036,345 | 7/1991 | Kawano | 354/126 |
| 5,115,265 | 5/1992 | Swayze | 354/288 |
| 5,177,517 | 1/1993 | Schappler et al. | 354/82 |
| 5,229,798 | 7/1993 | Brown | 354/293 |

Primary Examiner—Monroe H. Hayes
Attorney, Agent, or Firm—Roger A. Fields

[57] ABSTRACT

A compact camera has a flash unit/viewfinder which in a non-operative folded position covers a handle for the camera body.

2 Claims, 4 Drawing Sheets

COMPACT CAMERA WITH COVER FOR HANDLE

FIELD OF THE INVENTION

The invention relates generally to the field of photography, and more particularly to compact cameras. Specifically, the invention relates to a compact camera with a handle and a flash unit and/or viewfinder that can be folded against the camera body to prevent its use and to cover the handle.

BACKGROUND OF THE INVENTION

No matter how good a camera may be or how accurately it has been made, it cannot yield really acceptable results if it is moved during picture-taking. Much of the poor definition obtained by amateur and professional photographers is caused by a slight movement of the camera during the time that its shutter is open. Thus, it is well known to provide a camera with a handle or handgrip that is grasped by ones hand to hold the camera steady during picture-taking. For example, see commonly assigned U.S. Pat. No. 4,796,034, issued Jan. 3, 1989, and No. 5,177,517, issued Jan. 5, 1993.

PROBLEM TO BE SOLVED BY THE INVENTION

Typically in today's compact cameras the addition of a handle to hold the camera steady is desired because of the small size of the camera. However, the handle increases the size of the camera and may make it awkward for storage.

SUMMARY OF THE INVENTION

According to the invention, a compact camera comprising a camera body, a handle projecting from the camera body to be grasped by the hand to hold the camera body steady during picture-taking, and a camera element connected to the camera body for movement between folded and unfolded positions relative to the camera body, is characterized in that:

the camera element is configured to cover the handle to prevent the handle from being grasped when the camera element is in its folded position and to uncover the handle to permit the handle to be grasped when the camera element is in its unfolded position.

More specifically, the camera element includes a direct-vision viewfinder that is located beyond the camera body to see through the viewfinder when the camera element is in its unfolded position and is blocked by the handle to prevent seeing through the viewfinder when the camera element is in its folded position.

Also, the camera element may include a flash unit and is configured to cover a shutter release and a taking lens when the camera element is in its folded position and to uncover the shutter release and the taking lens when the camera element is in its unfolded position.

ADVANTAGEOUS EFFECT OF THE INVENTION

A compact camera with the addition of a handle is achieved without any substantial increase in size, owing to a folding viewfinder and/or flash unit.

DETAILED DESCRIPTION OF THE INVENTION

The invention is disclosed as being embodied preferably in a compact camera. Because the features of a compact camera are generally known, the description which follows is directed in particular only to those elements forming part of or cooperating directly with the disclosed embodiment. It is to be understood, however, that other elements may take various forms known to a person of ordinary skill in the art.

Figure 1:
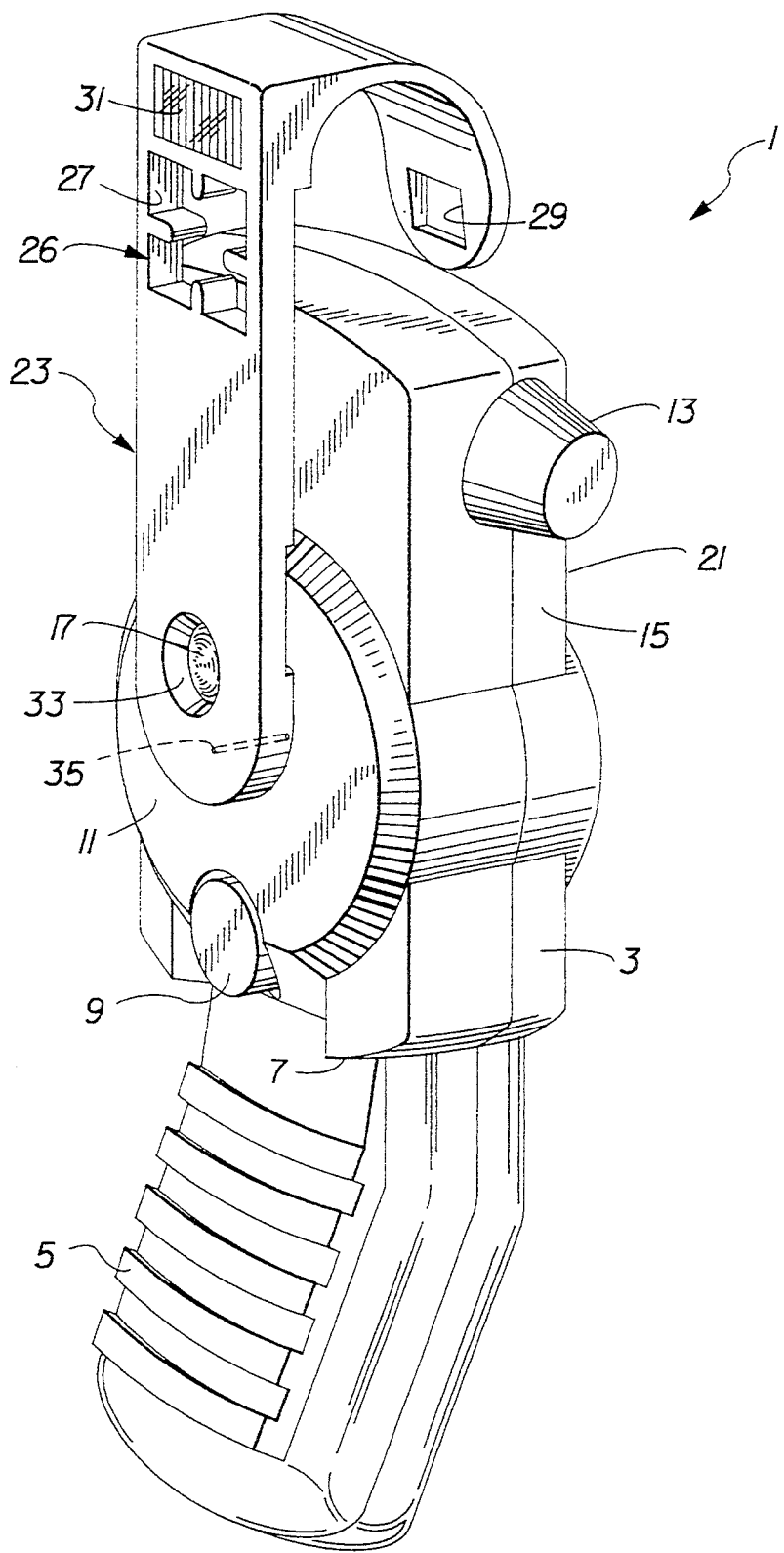
FIG. 1 is a front perspective view of a compact camera according to a preferred embodiment of the invention, showing the camera with a flash unit/viewfinder in an operative unfolded position removed from a handle.
Figure 2:
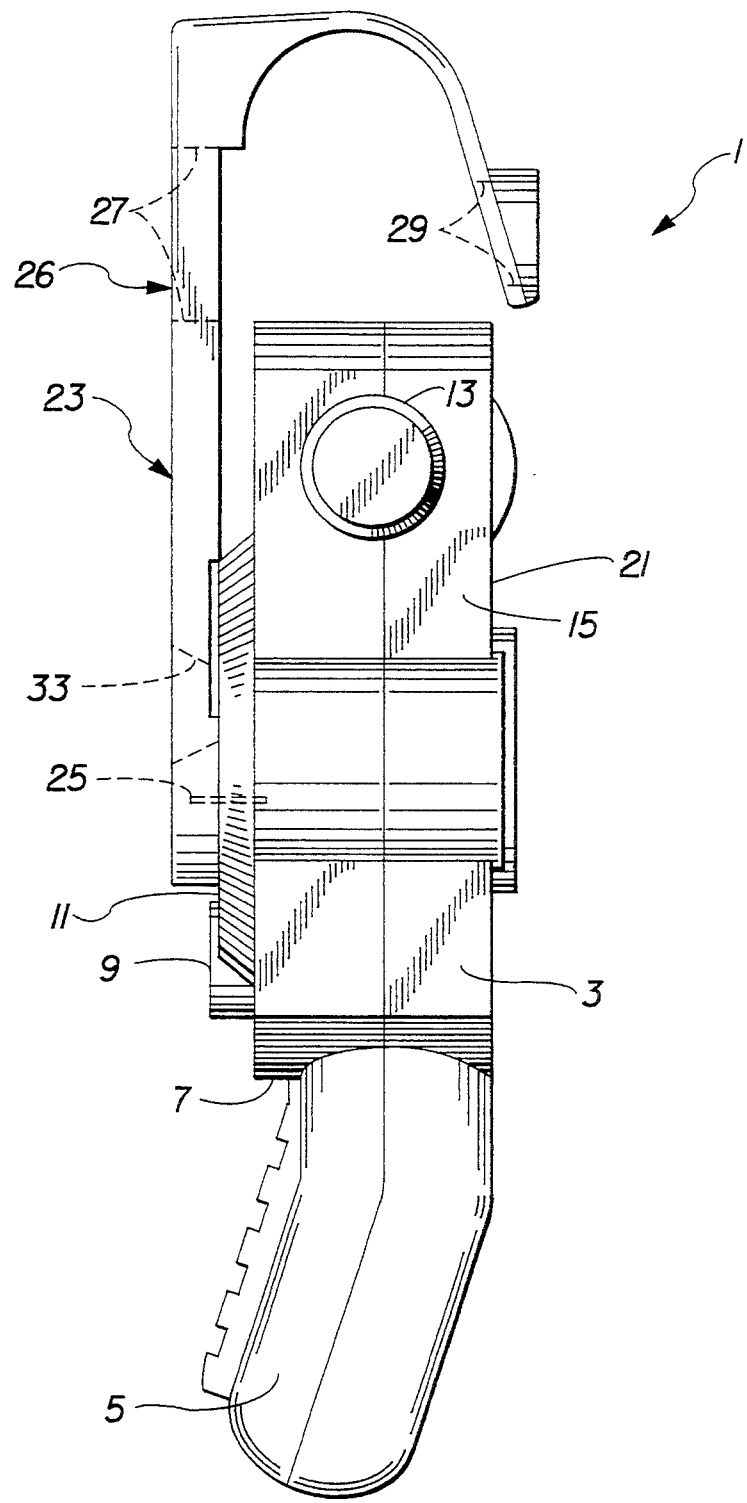
FIG. 2 is a side elevation view of the camera as depicted in FIG. 1.
Figure 3:
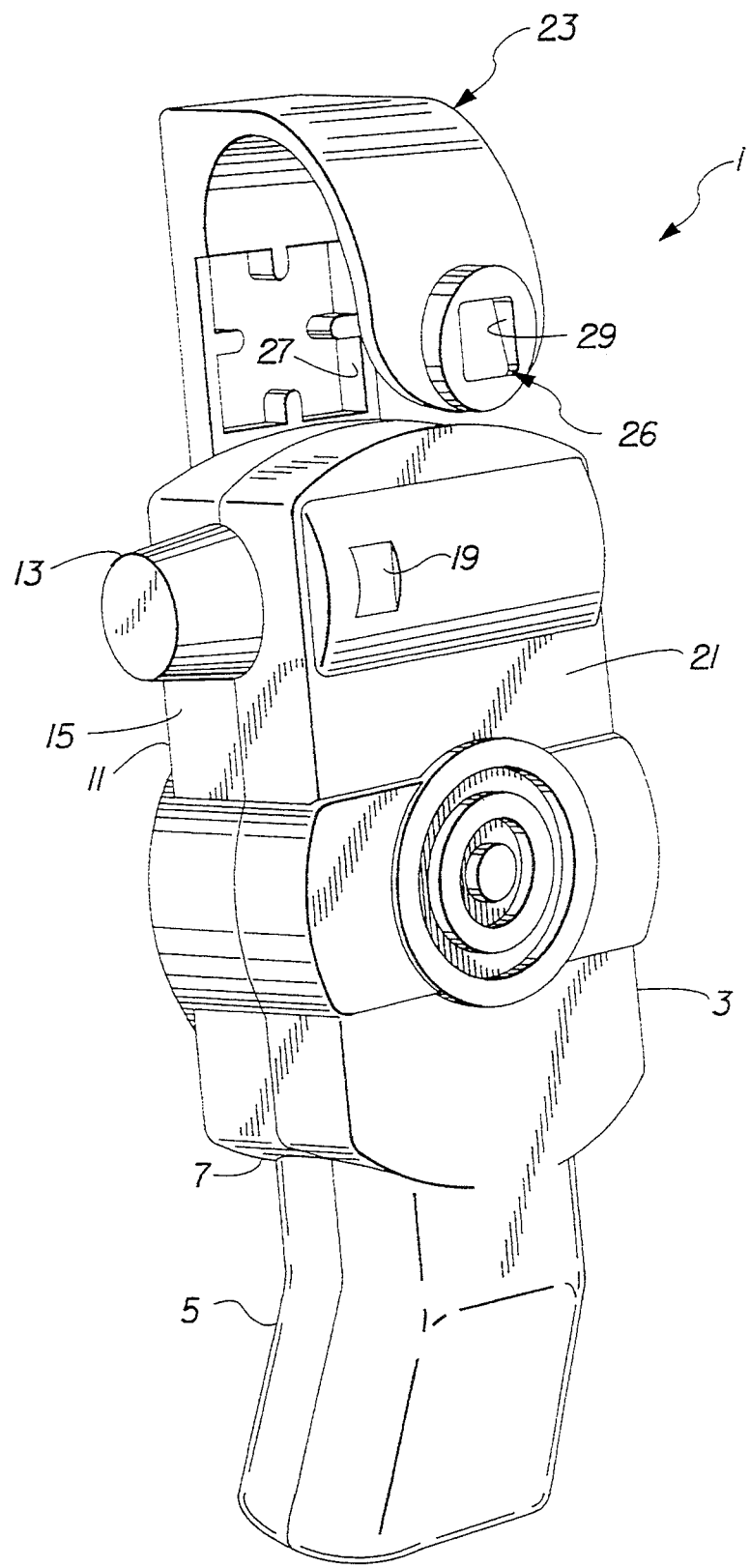
FIG. 3 is a is a rear perspective view of the camera as depicted in FIG. 1.

Referring now to the drawings, FIGS. 1-3 show a compact camera 1 having a camera body 3 which includes a handle 5 depending from the extreme bottom 7 of the camera body, a shutter release button 9 located on the front 11 of the camera body, a film advance or winding knob 13 located on one side 15 of the camera body, a taking lens 17 located on the front of the camera body, and a frame counter 19 located on the rear 21 of the camera body.

Figure 4:
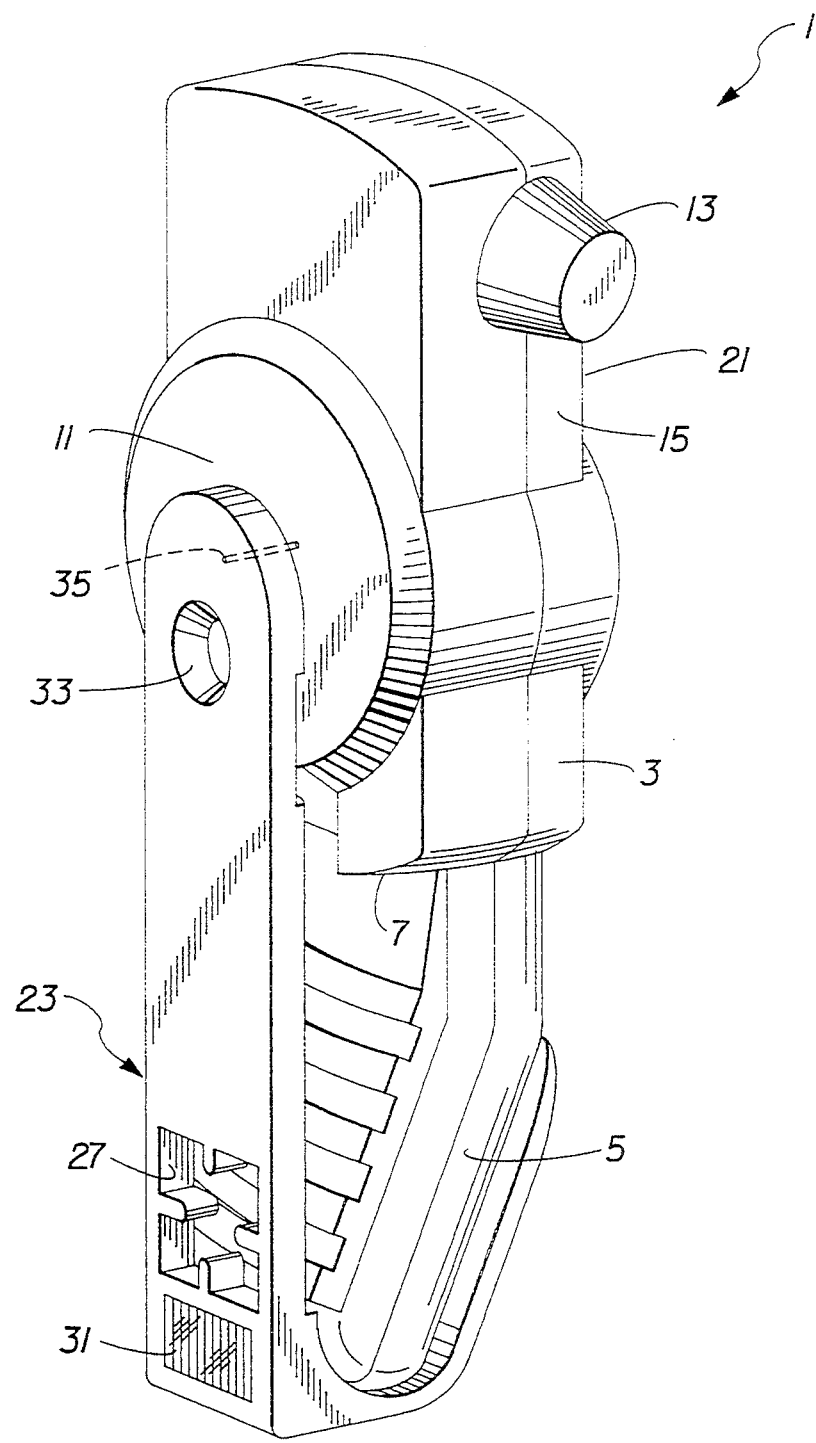
FIG. 4 is a front perspective view of the camera, showing the flash unit/viewfinder in an nonoperative folded position covering the handle.

A cover 23 for the handle 5 is pivotally connected to the camera body 3 via a pivot pin 25, located between the shutter release button 9 and the taking lens 17, for movement between an unfolded position removed from the handle, the shutter release button, and the taking lens as shown in FIGS. 1-3 and a folded position covering the handle, the shutter release button, and the taking lens as shown in FIG. 4. Known locking means, not shown, releasably secure the cover 23 in its unfolded and folded positions. The cover 23 includes a direct-vision viewfinder 26 comprising a front viewfinder opening 27 and a rear viewfinder opening 29, and it includes an electronic flash unit 31 adjacent the front viewfinder opening and a central opening 33 for the taking lens 17. When the cover 23 is in its unfolded position, the front and rear viewfinder openings 27 and 29 and the flash unit 31 are elevated above the camera body 3 and the central opening 33 is aligned with the taking lens 17 as shown in FIG. 1. Conversely, when the cover 23 is in its folded position, the handle 5 is located between the front and rear viewfinder openings 27 and 29 and the central opening 33 is removed from the taking lens 17 as can be appreciated from FIG. 4.

The invention has been described with reference to a preferred embodiment. However, it will be appreciated that variations and modifications can be effected by a person of ordinary skill in the art without departing from the scope of the invention.

PARTS LIST FOR FIGS. 1-4

1. compact camera
3. camera body
5. handle
7. extreme bottom
9. shutter release button
11. front
13. film advance knob
15. side
17. taking lens 19. frame counter
21. rear
23. cover
25. pivot pin
26. viewfinder
27. front viewfinder opening
29. rear viewfinder opening
31. flash unit
33. central opening

What is claimed is:

1. A compact camera comprising a camera body, a handle projecting from said camera body to be grasped by the hand to hold the camera body steady during picture-taking, and a camera element connected to said camera body for movement between folded and unfolded positions relative to the camera body to cover said handle to prevent the handle from being grasped when the camera element is in its folded position and to uncover the handle to permit the handle to be grasped when the camera element is in its unfolded position, is characterized in that:

said camera element includes a see-through viewfinder having a front viewfinder opening in the camera element that lies over a front portion of said handle when the camera element is in its folded position and a rear viewfinder opening in the camera element that lies over a rear position of the handle when the camera element is in its folded position, to make the handle block said front and rear viewfinder openings to prevent seeing through said see-through viewfinder when the camera element is in its folded position.

2. A compact camera comprising camera body, a handle projecting from said camera body to be grasped by the hand to hold the camera body steady during picture-taking, and a camera element connected to said camera body for movement between folded and unfolded positions relative to the camera body to cover said handle to prevent the handle from being grasped when the camera element is in its folded position and to uncover the handle to permit the handle to be grasped when the camera element is in its unfolded position, is characterized in that:

said camera element is connected to the front of said camera body between a taking lens and a shutter release at the front of the camera body to cover both said taking lens and said shutter release to protect the taking lens and prevent use of the shutter release when the camera element is in its folded position, in addition to covering said handle to prevent the handle from being grasped, and has a hole that is aligned with the taking lens and is configured to be removed from the shutter release when the camera element is in its unfolded position.

* * * * *